United States Patent
Wild et al.

(10) Patent No.: US 10,926,634 B2
(45) Date of Patent: Feb. 23, 2021

(54) USER INTERFACE AND METHOD FOR OPERATING A USER INTERFACE FOR A TRANSPORTATION MEANS

(71) Applicant: VOLKSWAGEN AG, Wolfsburg (DE)

(72) Inventors: Holger Wild, Berlin (DE); Nils Kötter, Braunschweig (DE)

(73) Assignee: Volkswagen AG

( * ) Notice: Subject to any disclaimer, the term of this patent is extended or adjusted under 35 U.S.C. 154(b) by 397 days.

(21) Appl. No.: 15/538,843

(22) PCT Filed: Dec. 18, 2015

(86) PCT No.: PCT/EP2015/080624
§ 371 (c)(1),
(2) Date: Jun. 22, 2017

(87) PCT Pub. No.: WO2016/107770
PCT Pub. Date: Jul. 7, 2016

(65) Prior Publication Data
US 2019/0152318 A1 May 23, 2019

(30) Foreign Application Priority Data

Jan. 2, 2015 (EP) .................................... 15150030

(51) Int. Cl.
*B60K 35/00* (2006.01)
*B60K 37/06* (2006.01)
(Continued)

(52) U.S. Cl.
CPC .............. *B60K 35/00* (2013.01); *B60K 37/06* (2013.01); *G06F 3/0481* (2013.01);
(Continued)

(58) Field of Classification Search
None
See application file for complete search history.

(56) References Cited

U.S. PATENT DOCUMENTS 5,781,872 A * 7/1998 Konishi ................. B60K 35/00
340/438
5,847,704 A * 12/1998 Hartman ............. B60R 16/0231
715/764

(Continued)

FOREIGN PATENT DOCUMENTS

CN 102365525 A 2/2012
CN 102968243 A 3/2013
(Continued)

OTHER PUBLICATIONS

PCT International Search Report and Written Opinion completed by the ISA/EP dated Apr. 18, 2016 and issued in connection with PCT/EP2015/080624.
(Continued)

*Primary Examiner* — Curtis J King
(74) *Attorney, Agent, or Firm* — Barnes & Thornburg LLP

(57) ABSTRACT

Proposed is a transportation vehicle, a user interface and a method for operating a user interface for a transportation vehicle. The method may comprise the steps of: defining a screen background graphic for a display device of the transportation means, automatically detecting a situation in which a predefined region of the wallpaper has been covered by an item of foreground content, and, in response thereto, automatically repositioning the wallpaper in relation to the foreground content for preventing the region from being covered by the foreground content.

12 Claims, 4 Drawing Sheets

(51) Int. Cl.
  *G06F 3/0481* (2013.01)
  *G01C 21/36* (2006.01)
(52) U.S. Cl.
  CPC ..... *B60K 2370/11* (2019.05); *B60K 2370/146* (2019.05); *B60K 2370/1438* (2019.05); *G01C 21/36* (2013.01); *G06F 2203/04803* (2013.01)

(56) References Cited

U.S. PATENT DOCUMENTS

| | | | | |
|---|---|---|---|---|
| 6,750,832 | B1* | 6/2004 | Kleinschmidt | B60K 35/00 345/7 |
| 7,683,771 | B1* | 3/2010 | Loeb | B60K 35/00 340/438 |
| 7,786,851 | B2* | 8/2010 | Drew | B60K 35/00 340/438 |
| 7,928,837 | B2* | 4/2011 | Drew | G01C 21/00 340/438 |
| 8,339,254 | B2* | 12/2012 | Drew | B60K 35/00 340/438 |
| 9,310,218 | B2 | 4/2016 | Choi | |
| 2002/0075407 | A1* | 6/2002 | Cohen-Solal | H04N 21/4221 348/565 |
| 2006/0158740 | A1* | 7/2006 | Stoschek | B60K 35/00 359/630 |
| 2007/0097091 | A1* | 5/2007 | Ng | B60K 35/00 345/173 |
| 2007/0171142 | A1* | 7/2007 | Ikarashi | B60K 35/00 345/4 |
| 2009/0021491 | A1* | 1/2009 | Kawamura | B60K 35/00 345/173 |
| 2009/0327977 | A1* | 12/2009 | Bachfischer | B60K 35/00 715/863 |
| 2011/0148917 | A1 | 6/2011 | Alberth, Jr. et al. | |
| 2011/0320117 | A1 | 12/2011 | Sempuku et al. | |
| 2013/0010117 | A1* | 1/2013 | Miyoshi | B60R 1/00 348/148 |
| 2013/0138343 | A1* | 5/2013 | Choi | G01C 21/3679 701/527 |
| 2013/0322634 | A1* | 12/2013 | Bennett | G10L 21/00 381/17 |
| 2014/0053094 | A1* | 2/2014 | Grevinga | G06F 3/04883 715/771 |
| 2014/0152551 | A1* | 6/2014 | Mueller | G06F 3/017 345/156 |
| 2014/0165005 | A1* | 6/2014 | Takikawa | G06F 3/04817 715/835 |
| 2014/0320528 | A1* | 10/2014 | Nanba | B60K 35/00 345/629 |
| 2014/0365928 | A1* | 12/2014 | Boelter | G06F 3/04883 715/765 |
| 2015/0015479 | A1* | 1/2015 | Cho | G06F 3/013 345/156 |
| 2015/0268465 | A1* | 9/2015 | Nagata | G06F 3/1423 345/1.1 |
| 2016/0046188 | A1* | 2/2016 | Wild | B60K 35/00 701/36 |
| 2016/0328244 | A1* | 11/2016 | Ahmed | G06F 3/0482 |
| 2017/0008398 | A1* | 1/2017 | Kaneko | B60K 35/00 |
| 2017/0013188 | A1* | 1/2017 | Kothari | B60R 11/0235 |
| 2017/0144544 | A1* | 5/2017 | Fujita | G01D 7/02 |
| 2017/0192629 | A1* | 7/2017 | Takada | G06F 3/0482 |
| 2017/0243389 | A1* | 8/2017 | Wild | B60K 37/06 |
| 2017/0313248 | A1* | 11/2017 | Kothari | B60K 35/00 |

FOREIGN PATENT DOCUMENTS

| | | |
|---|---|---|
| CN | 103052977 A | 4/2013 |
| CN | 103868515 A | 6/2014 |
| CN | 104216730 A | 12/2014 |
| DE | 19941962 A1 | 3/2001 |
| DE | 102006018672 A1 | 10/2007 |
| JP | H1039748 A | 2/1998 |
| WO | 20060108617 A2 | 10/2006 |
| WO | 2014065344 A1 | 5/2014 |

OTHER PUBLICATIONS

European Search Report and Opinion dated Jun. 23, 2015 and issued in connection with EP Patent Application No. 15150030.3.
Office Action for Chinese Patent Application No. 201580070321.1; dated Oct. 11, 2019.

* cited by examiner

USER INTERFACE AND METHOD FOR OPERATING A USER INTERFACE FOR A TRANSPORTATION MEANS

CROSS-REFERENCE TO RELATED APPLICATIONS

This application is a national stage entry under 35 USC § 371 of PCT International Application No. PCT/EP2015/080624, filed Dec. 18, 2015, and claims the benefit under 35 USC § 119(e) to European Patent Application Number 15150030.3, filed Jan. 2, 2015.

SUMMARY

The present invention relates to a transportation vehicle, a user interface and a method for operating a user interface for a transportation vehicle. In particular, the present invention relates to a suitable use of a plurality of layers on a display device of a user interface.

BRIEF DESCRIPTION OF THE DRAWINGS

The exemplary embodiments of the invention will be described below in detail with reference to the accompanying drawings, in which.

DETAILED DESCRIPTION OF THE DISCLOSED EMBODIMENTS

Figure 1:
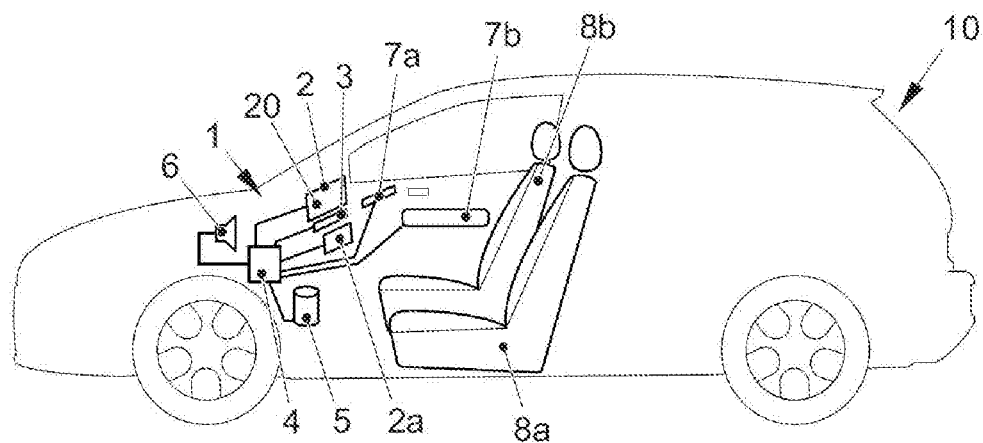
FIG. 1 shows an overview of components of an exemplary embodiment of a transportation vehicle according to the present disclosure with an exemplary embodiment of a user interface.

An object of the present disclosure is to provide a method for operating a user interface for a transportation vehicle. The user interface comprises a display device which can be provided, for example, for permanent mounting, and/or integration in terms of information technology and mechanics into a transportation means. In a first step, a screen background graphic (referred to below as "wallpaper") is defined. A wallpaper may appear, for example, as a rearmost plane in an item of screen content and dynamic and operating-state-dependent items of content (e.g. tiles, windows, time, folders, files etc.) can be proportionally superimposed thereon. In a second step, there is automatic detection of the fact that a predefined region of the wallpaper would be covered in future by an item of foreground content. The predefined region may be, for example, a region of increased interest, which is defined at the factory or by a user and is preferably not to be covered by the foreground content. Of course, both entirely avoiding coverage of the predefined region by the foreground content and temporarily covering and subsequently automatically removing the coverage (for example by moving the foreground content with respect to the wallpaper or vice versa) will be understood as being within the scope of the present disclosure. In response to the automatic detection, the wallpaper and the foreground content are automatically repositioned relative to one another in order to avoid the coverage of the region by the foreground content. In this way, the predefined region can be seen by the user, while the foreground content would, according to the prior art, cover the region and therefore could bring about esthetic disadvantages and disadvantages in terms of information technology.

Within the scope of the present disclosure, the wallpaper can of course have an item dynamic content. In other words, the wallpaper has the property that its optical content changes automatically over time. For example, different images may be included in the manner of a slide show, said images being displayed in succession (e.g. after the expiry of a predefined respective displaying time). However, alternatively or additionally the wallpaper may also contain moving content. For example, the wallpaper may be configured as a navigation map which changes as a function of a movement of the transportation means or in response to a zoom interaction. Insofar as a current position of the transportation means is indicated on the map, the current position (also "cursor") can be predefined as a predefined region within the scope of the present disclosure. This prevents the current position and, if appropriate, its relatively close surroundings from being covered by items of foreground content, which improves the possibility of using the respective wallpaper for route guidance.

A further possible way of using dynamic wallpaper can be to illustrate vehicle operating parameters. For example, a load distribution, a flow of energy (e.g. between a traction battery and an electric machine or the driven wheels) can be illustrated by means of a graphic. In such a graphic, for example flows of energy and/or flows of power can be visualized in the manner of a flow of fluid. Alternatively or additionally, numerical values relating to a current power level, relating to a current force and/or relating to a current torque or the like on corresponding components and in particular on the wheels of the transportation means can be displayed. The integration of such items of content into the wallpaper obviates the need to display a plurality of windows of an item of foreground content one next to the other, which can make the visual appearance of a screenshot calmer and advantageously configure it in an esthetic fashion. Furthermore, habituation effect of the user with respect to the items of wallpaper content can lead to a situation in which the user can find said items of content more easily and more quickly and with less cognitive effort. The abovementioned aspects of items of dynamic content for wallpaper and, in particular, the use of a navigation map as a wallpaper can also constitute, individually or in combination with one another, features which are independent of the repositioning and for which protection can be sought.

The repositioning can comprise adapting a portion of the wallpaper. For example, another portion of a graphic file which is to be displayed can be displayed on the available screen surface. Correspondingly, when a map material is used a previously displayed portion of the map can be moved.

In particular, a current position of the transportation means in the map material can be moved to another position on the screen at which it is not covered by an item of foreground content which is to be additionally displayed. Since the current position of the transportation means is usually indicated in the center of the map, this can mean that the current position of the transportation means is moved into an edge region or to an eccentric position of the screen.

Alternatively or additionally, the repositioning (to be understood within the scope of the present disclosure as "modified relative positioning of the foreground content with respect to the wallpaper") can comprise adapting the foreground content. For example, the size of a tile displayed in the foreground of the current screen can be changed and/or a position of the tile with respect to a position which is provided independently of the wallpaper or the predefined region can be displayed. Of course, renewed repositioning can also be provided if the predefined region or the foreground content changes its size and/or position on the screen in the course of time, as is the case, for example, for the vehicle position in the course of a journey on a fixed portion of the map.

Of course, a plurality of predefined regions can also be predefined on the wallpaper for the avoidance of coverage by an item of foreground content and can be predefined by the user.

Possible areas of interest on the wallpaper are, for example, an actual position and/or a starting position and/or a destination position and/or a position of a subsequent imminent route guidance maneuver. Other possibilities for predefined regions are animations for illustrating operating states of the transportation means and esthetically relevant regions in the wallpaper (e.g. the face of a photographed position).

The predefined region can, for example, already be automatically predefined by the route guidance in conjunction with the portion of the map which is used (zoom factor) and/or predefined in the software of the delivery state. Alternatively or additionally, the predefined region can be defined by a user. For this purpose, the user can, for example, define a region in a wallpaper by drawing a circle around said region with his finger or dragging a frame over the region or the like. If the included contents are already conditioned in terms of information technology, the user can also select the region from a list. After the definition of a wallpaper, the user can also be requested automatically to define the region.

The foreground content can comprise a tile which can be thematically configured by a user. For example, the user can select a thematic region with respect to which information and control buttons are displayed in the tile. Such a configuration can be carried out, for example, by means of a configuration menu.

According to a second aspect of the present disclosure, a computer program product (e.g. a data memory) is proposed on which instructions are stored which enable a programmable processor of a user interface to carry out the steps of a method according to the first-mentioned aspect of the present disclosure. The computer program product can be configured as a CD, DVD, Blue Ray disk, flash memory, hard disk, RAM/ROM, cache etc.

According to a third aspect of the present disclosure a signal sequence is proposed which represents information which enables a programmable processor of a user interface to carry out steps of a method according to the first-mentioned aspect of the present disclosure. In this way, the provision of the information in terms of information technology is protected in the event of the memory means which are necessary for this being outside the scope of validity of the appended claims.

According to a fourth aspect of the present disclosure, a user interface for a transportation means is proposed which has a display device (e.g. a screen which is let, for example, into the dashboard of the transportation means), a detection device for detecting user gestures (e.g. a touch-sensitive surface) and an evaluation unit (e.g. comprising a programmable processor). The display device is configured to display a screen background graphic ("wallpaper"). The evaluation unit is configured to detect that a predefined region of the wallpaper would be covered by an item of foreground content owing to a detected event. Only after the occurrence of said coverage is it also possible to detect and eliminate it according to the present disclosure by automatically repositioning the wallpaper with respect to the foreground content in order to avoid coverage of the region. In other words, a relative arrangement between the foreground content and the wallpaper is carried out, wherein automatic movement and/or changing of the order of magnitude of the foreground content and/or of the wallpaper take/takes place. As a rule, the predefined region of the wallpaper is visible despite (continuous) displaying of the foreground content.

According to a fifth aspect of the present disclosure, a transportation means (e.g. a passenger car, a transporter, a truck, a motorbike, an aircraft and/or watercraft) are proposed which has a user interface according to the fourth-mentioned aspect of the present disclosure. The components of the user interface can be proportionally or completely permanently integrated mechanically and/or in terms of information technology into the transportation means. For example, the display device can be provided as a combination instrument and/or as a central information display (CID). The features, combinations of features and the advantages arising therefrom correspond to what is stated in conjunction with the method according to the present disclosure so clearly that the above statements will not be repeated in order to avoid repetitions.

FIG. 1 shows a passenger car 10 as a transportation vehicle, sometimes called transportation means, in which an exemplary embodiment of a user interface 1 according to the present disclosure is installed. A screen 2 is provided as a display device and is equipped with a touch-sensitive surface 20 as a component of a detection device. An infrared LED strip 3 is provided as a further component of the detection device underneath the screen 2 and is configured to detect user gestures (3D gestures) which have taken place freely in space and convert them into electrical signals. A further (smaller) screen 2a, by means of which heating/air-conditioning scopes can be displayed and operated, is provided underneath the infrared LED strip 3. A data memory 5 is provided for keeping available references for user gestures and instructions for the execution of a method for this purpose, like the abovementioned components, is connected in terms of information technology to an electronic control unit 4 as an evaluation unit. The electronic control unit 4 can output information tones and warning tones by means of a loudspeaker 6. Likewise, user gestures and repositioning processes can be accentuated or acknowledged acoustically. Two ambient light strips 7a, 7b are connected in terms of information technology to the electronic control unit 4 which can adapt the output color and intensity of light to the wishes of the user. A driver's seat 8a and a front seat passenger's seat 8b are provided for accommodating the user in the form of a driver or a front seat passenger.

Figure 2:
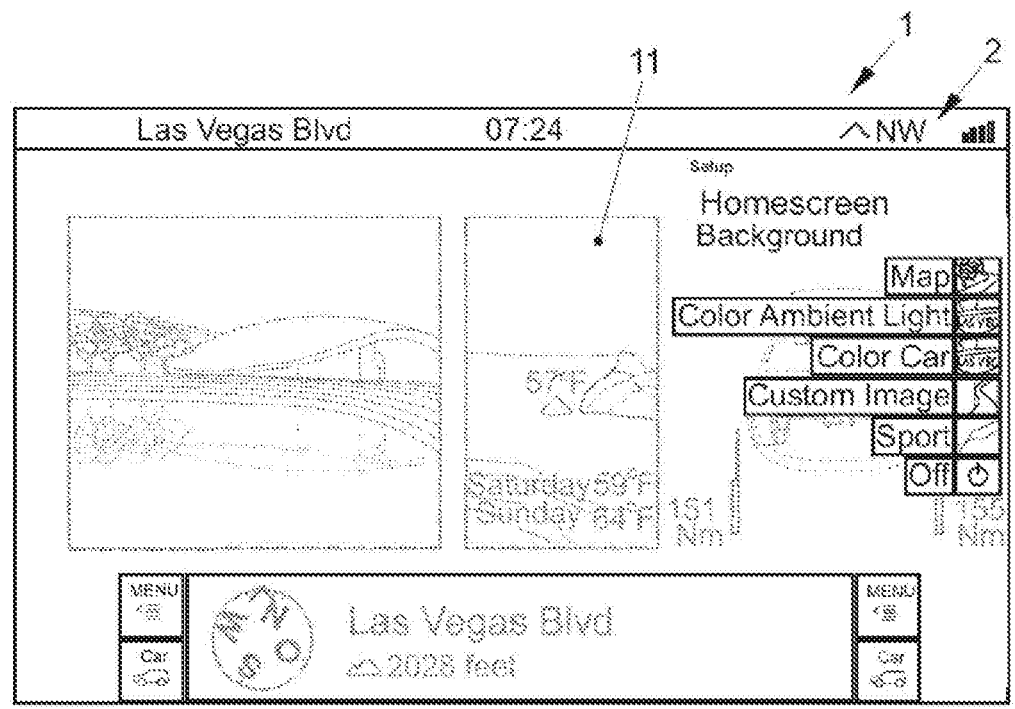
FIG. 2 shows a screenshot of an exemplary embodiment of a user interface according to the present disclosure in which a selection menu for defining a wallpaper is represented.

FIG. 2 shows a screenshot of a selection menu for defining a wallpaper 11 of a homescreen which is displayed on a screen 2 of a user interface 1 according to the present disclosure. Available for selection are (from top to bottom) a road map, a wallpaper which is in harmony with the ambient light, a wallpaper which is in harmony with the color of the vehicle, an image which can be freely defined or stored by the user, dynamic displays relating to characteristic variables of current settings of the transportation means and an "off" state.

Figure 3:
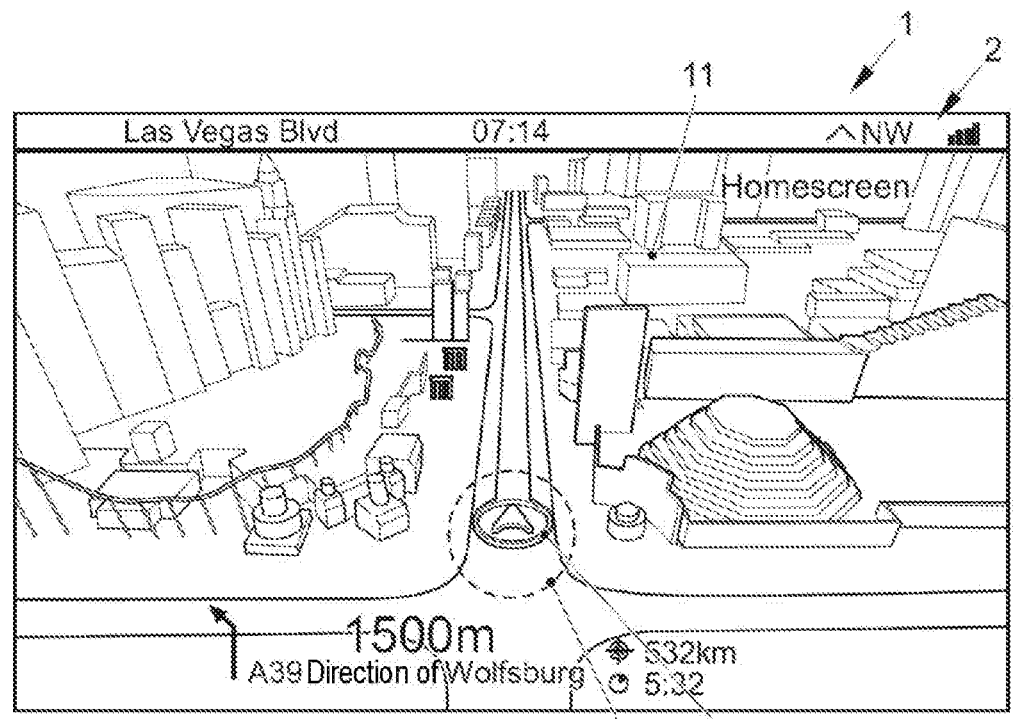
FIG. 3 shows a screenshot of an exemplary embodiment of a user interface with dynamic wallpaper in the manner of a route guidance map.

FIG. 3 shows the result of a selection of the menu item (road map) at the top in FIG. 2, in response to a three-dimensional and perspective view of the current surroundings of the vehicle position 19 is displayed as dynamic wallpaper 11. In this context, the vehicle position 19 and its immediate surroundings are characterized as a predefined region 12 which if possible is not to be covered by items of foreground content in order to visibly display imminent maneuvers and the immediate surroundings of the transportation means on the screen 2.

Figure 4:
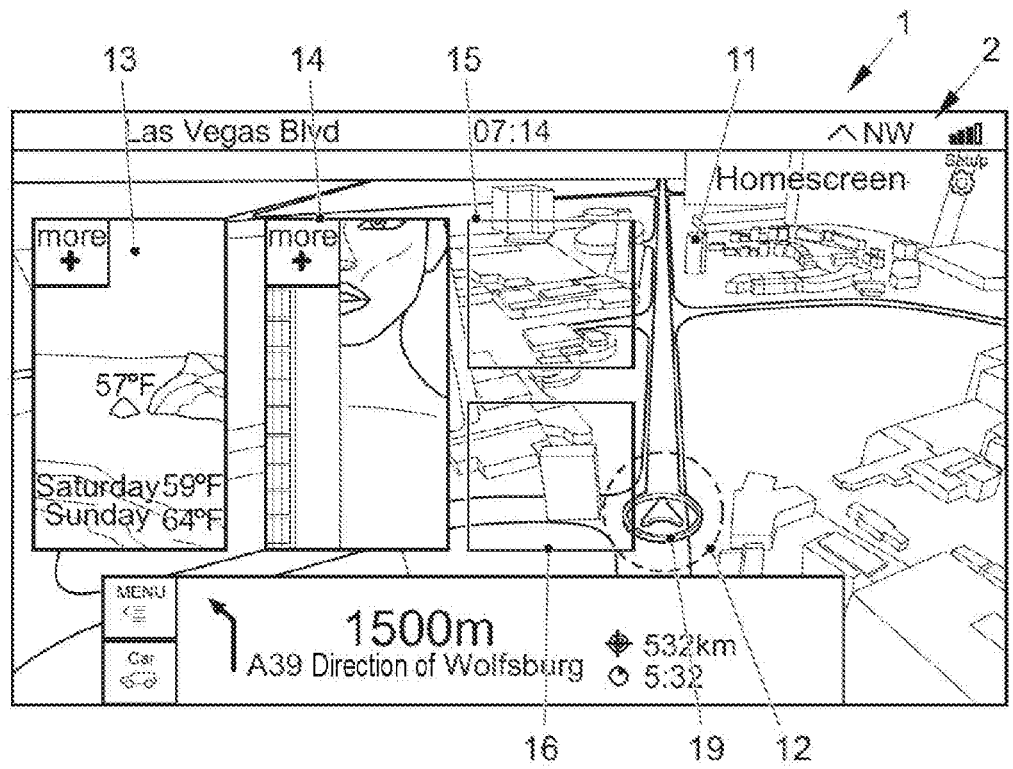
FIG. 4 shows a screenshot of an exemplary embodiment of a user interface in which a predefined region for avoiding coverage with respect to items of foreground content is repositioned.

FIG. 4 shows the road map shown in FIG. 3 as dynamic wallpaper 11 in which tiles 13, 14, 15, 16 display, as items of foreground content, different information relating to the weather and to the music which is currently being played. Two tiles 15, 16 are to be defined in more detail with respect to their content. In order to display the predefined region 12 and the vehicle position 19 as well as possible visually, the detail of the map has been moved with respect to the illustration in FIG. 3 in such a way that the vehicle position 19 and the predefined region 12 are now displayed in the right-hand half of the screen 2 and therefore on the right next to the tiles 13, 14, 15, 16. The two previously empty tiles 15, 16 do not, however, disrupt the visibility of the vehicle position 19, since after the screenshot has been changed into a display mode the tiles 15, 16 are no longer displayed and can therefore permit free view of the predefined region 12.

Figure 5:
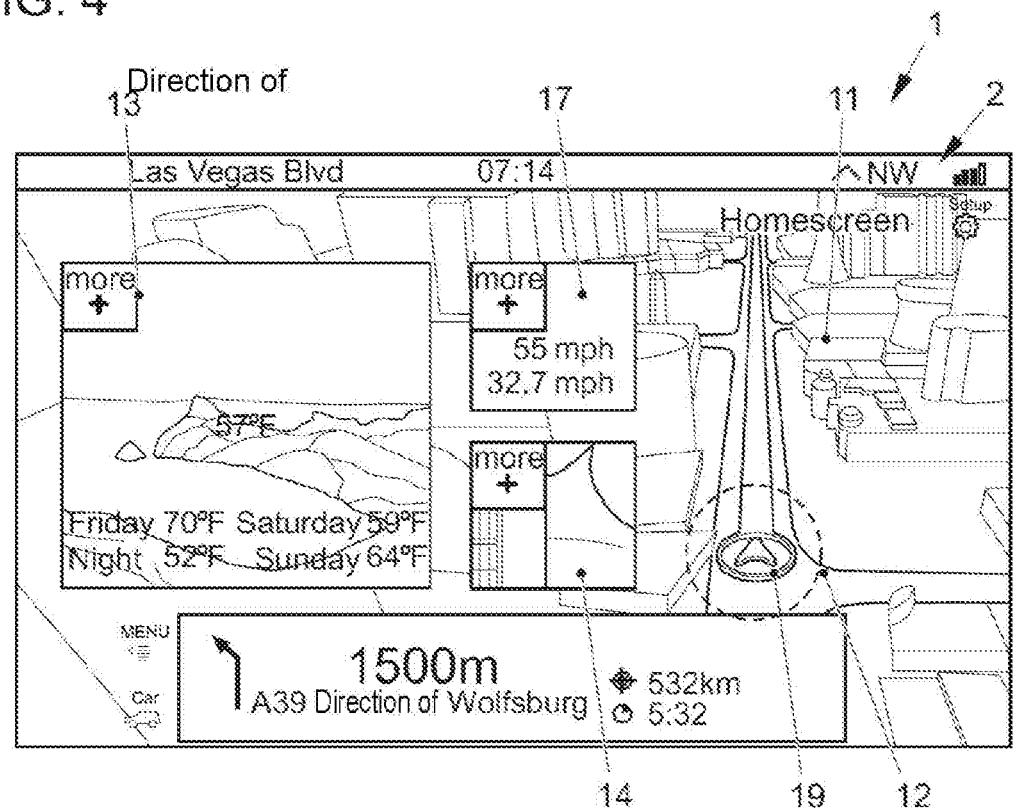
FIG. 5 shows a screenshot of an exemplary embodiment of a user interface with an item of foreground content which is modified compared to FIG. 4.

FIG. 5 shows an alternative arrangement of tiles 13, 14, 17 as items of foreground content which have ensured that the vehicle position 19 and the predefined region 12 are moved further to the right onto the screen 2.

Figure 6:
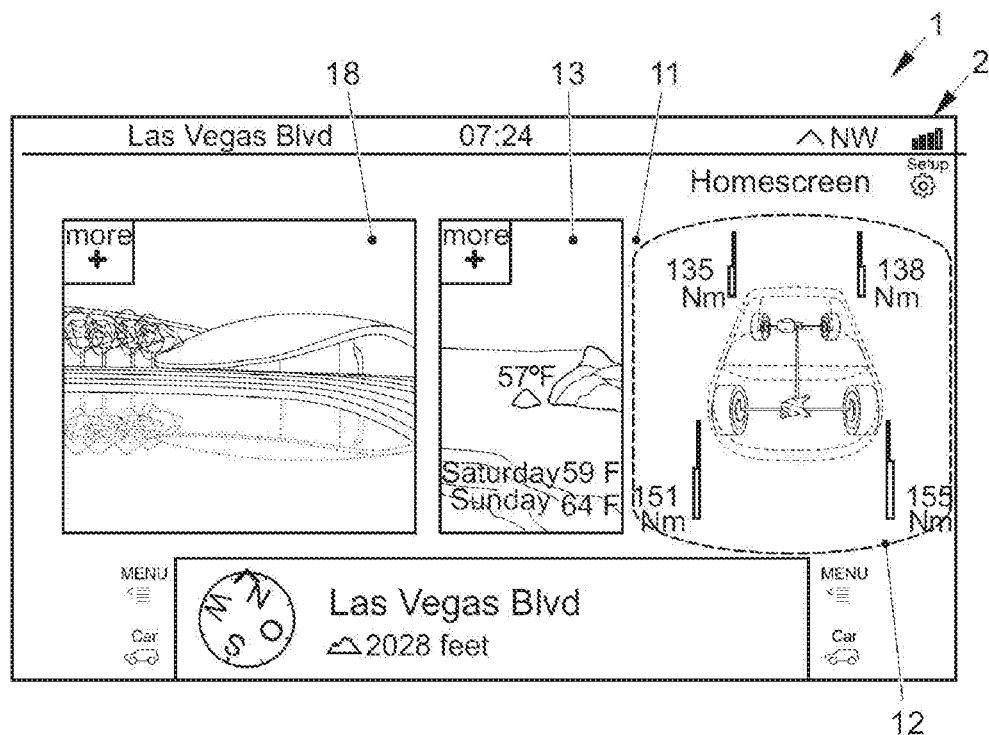
FIG. 6 shows a screenshot of an exemplary embodiment of a user interface with dynamic wallpaper which illustrates a current load distribution to driven wheels of the transportation vehicle.

FIG. 6 shows an alternative exemplary embodiment of dynamic wallpaper behind two tiles 13, 18 as items of foreground content, wherein to the right of the two tiles 13, 18 a transparent vehicle model is displayed with a drive train which is displayed in a non-transparent fashion as a predefined region 12. The current load distribution among the driven wheels is indicated by numerical values for the currently transmitted torque. If the load distribution changes, the displayed numerical values are also changed. In order always to ensure the visual detectability of the region 12, after the detection of the user's wish with respect to the display of the tiles 13, 18, said tiles have been adapted in terms of their size and position in such a way that they are displayed on the left next to the predefined region 12 on the screen 2.

Figure 7:
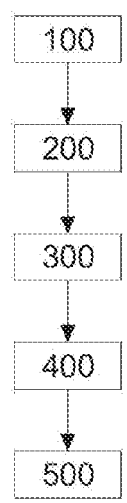
FIG. 7 shows a flowchart illustrating steps of an exemplary embodiment of a method according to the present disclosure.

FIG. 7 shows steps of an exemplary embodiment of a method according to the present disclosure for operating a user interface for a transportation means. In step 100, a screen background graphic for a display device of the transportation means is defined. In step 200 the user is requested to define a region of increased interest within the wallpaper. The user can for this purpose "pull up" a window, circle a region of the wallpaper with his finger on the screen or select elements from a list which correspond to regions within the wallpaper. In response to a corresponding user input, in step 300 the region in the wallpaper is predefined. In other words, in terms of information technology an image region is defined whose continuing visibility is to be ensured where possible and with consideration of predefined priorities between the foreground content and the wallpaper. In step 400 it is automatically detected that the predefined region of the wallpaper would be covered in future by an item of foreground content which is to be subsequently displayed. In response to this, in step 500 the wallpaper is automatically repositioned with respect to the foreground content in order to avoid coverage of the region by the foreground content. In other words, a relative arrangement between the wallpaper and the foreground content which ensures that the predefined region is not covered by the foreground content to be displayed is provided.

Modern transportation vehicles frequently have graphic user interfaces on which optional contents can be displayed. In this context, there is also an increasing wish from users for the graphic user interfaces to be personalized or individualized. For example, the homescreen represents in future vehicles that region which the customer can individualize according to his own wishes with background images (self-created photos or the like) and layouts (for example tile-based) in the vehicle. In the background images ("wallpaper"), of course individual regions are of greater interest/ have more information content or are of greater esthetic benefit for the user than other regions. If items of foreground content (e.g. tiles whose content can sometimes be personalized) are displayed, the items of foreground content cover parts of the wallpaper. For example, in the case in which the wallpaper includes a face it may be desirable that where possible the face is not covered by the foreground content. In the prior art, approaches are sometimes proposed according to which a user can position the foreground content optionally. To do this, the user executes, for example, a swiping gesture by means of which he can move the foreground content to another region on the screen or to another region of the wallpaper. The manual movement can lead, owing to dynamic items of foreground content, to a situation in which frequent shifting actions have to be carried out by the user, which actions lead, in particular during the driving of the transportation means, to a considerable limitation of the attentiveness which is necessary to drive the vehicle. Therefore, an object of the present disclosure is to overcome the situation identified above.

Although the aspects according to the present disclosure have been described in detail on the basis of the exemplary embodiments explained in conjunction with the appended figures in the drawings, modifications and combinations of features of the represented exemplary embodiments are possible for a person skilled in the art without departing from the scope of the present disclosure whose scope of protection is defined by the appended claims.

LIST OF REFERENCES 1 user interface
2, 2a screen
3 infrared LED strip
4 electronic control unit
5 data memory
6 loudspeaker
7a, 7b ambient light strip
8a driver's seat
8b passenger's seat
10 passenger car
11 wallpaper 12 predefined region of increased interest
13, 14, 15, 16, 17, 18 tiles
19 cursor/vehicle position
20 touch-sensitive surface
100 to 500 method steps

The invention claimed is:

1. A method for a transportation vehicle, the method comprising:

defining a background graphic comprising dynamic wallpaper, wherein the dynamic wallpaper includes content that is displayed on a display device of the transportation vehicle, and wherein the displayed content of the dynamic wallpaper changes automatically over time; and in response to automatically detecting that a predefined region of the dynamic wallpaper would be covered by a foreground item, adapting the displayed content of the dynamic wallpaper to reposition the predefined region in relation to edges of the display device of the transportation vehicle to prevent the predefined region from being covered by the foreground item, wherein adaptation of the displayed content of the dynamic wallpaper changes a displayed size of the displayed content of the dynamic wallpaper and/or changes the displayed content of the dynamic wallpaper, wherein the dynamic wallpaper has dynamic content with moving contents, and wherein adaptation of the displayed content enables full unobscured display of the moving contents of the dynamic wallpaper while also displaying the foreground item.

2. The method of claim 1, wherein the wallpaper includes at least one of a route guidance map, an illustration of vehicle operating parameters, in particular a load distribution, and a graphic which is selected, in particular personally stored, by a user.

3. The method of claim 1, wherein the repositioning comprises adapting a displayed detailed portion of the dynamic wallpaper.

4. The method of claim 1, wherein the repositioning comprises adapting the foreground content.

5. The method of claim 1, wherein the predefined region includes at least one of a route guidance element and a face of a photographed person.

6. The method of claim 1, further comprising predefining the region in the dynamic wallpaper.

7. The method of claim 1, further comprising in response to selection of the dynamic wallpaper by a user, automatically interrogate a definition of the region by the user.

8. The method of claim 1, wherein the foreground content comprises a tile, and wherein an item of thematic content of the tile can be configured by a user.

9. The method of claim 1, wherein at least one of the size and position of the foreground content change/changes automatically over time.

10. A user interface for a transportation vehicle comprising:

a display device configured to display a background graphic comprising a dynamic wallpaper, wherein the dynamic wallpaper includes content that is displayed on the display device, and wherein the displayed content of the dynamic wallpaper changes automatically over time;

a detection device for detecting user gestures; and an evaluation unit configured to, in response to detecting that a predefined region of the dynamic wallpaper would be covered by a foreground item, adapt the displayed content of the dynamic wallpaper to reposition the predefined region with respect to edges of the display device of the transportation vehicle to prevent the predefined region from being covered by the foreground item, wherein to adapt the displayed content of the dynamic wallpaper changes a displayed size of the displayed content of the dynamic wallpaper and/or changes the displayed content of the dynamic wallpaper, wherein the dynamic wallpaper has dynamic content with moving contents, and wherein adaptation of the displayed content enables full unobscured display of the moving contents of the dynamic wallpaper while also displaying the foreground item.

11. A computer program product comprising instructions which, when executed by an evaluation unit of a user interface including a display device, a detection device for detecting user gestures, and the evaluation unit, cause the evaluation unit to define a background graphic comprising a dynamic wallpaper, wherein the dynamic wallpaper includes content that is displayed on the display device of the transportation vehicle, and wherein the displayed content of the dynamic wallpaper changes automatically over time, and in response to automatically detecting that a predefined region of the dynamic wallpaper would be covered by a foreground item, adapt the displayed content of the dynamic wallpaper to reposition the predefined region in relation to edges of the display device of the transportation vehicle to prevent the predefined region from being covered by the foreground item, wherein to adapt the displayed content of the dynamic wallpaper includes to change a displayed size of the displayed content of the dynamic wallpaper and/or to change the displayed content of the dynamic wallpaper, wherein the dynamic wallpaper has dynamic content with moving contents, and wherein adaptation of the displayed content enables full unobscured display of the moving contents of the dynamic wallpaper while also displaying the foreground item.

12. A transportation vehicle comprising a user interface including a display device, a detection device for detecting user gestures, and an evaluation unit, wherein the evaluation unit is configured to:

define a background graphic comprising a dynamic wallpaper, wherein the dynamic wallpaper includes content displayed on the displayed device, and wherein the displayed content of the dynamic wallpaper changes automatically over time, and in response to automatically detecting that a predefined region of the dynamic wallpaper would be covered by a foreground item, adapt the displayed content of the dynamic wallpaper to reposition the predefined region in relation to edges of the display device of the transportation vehicle to prevent the predefined region from being covered by the foreground item, wherein to adapt the displayed content of the dynamic wallpaper includes to change a displayed size of the displayed content of the dynamic wallpaper and/or to change the displayed content of the dynamic wallpaper, wherein the dynamic wallpaper has dynamic content with moving contents, and wherein adaptation of the displayed content enables full unobscured display of the moving contents of the dynamic wallpaper while also displaying the foreground item.

\* \* \* \* \*